United States Patent
Arimilli et al.

(10) Patent No.: US 6,421,763 B1
(45) Date of Patent: Jul. 16, 2002

(54) METHOD FOR INSTRUCTION EXTENSIONS FOR A TIGHTLY COUPLED SPECULATIVE REQUEST UNIT

(75) Inventors: Ravi Kumar Arimilli; Lakshminarayana Baba Arimilli, both of Austin; Leo James Clark, Georgetown; John Steven Dodson, Pflugerville; Guy Lynn Guthrie; James Stephen Fields, Jr., both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/345,642

(22) Filed: Jun. 30, 1999

(51) Int. Cl.[7] .............................................. G06F 12/08
(52) U.S. Cl. ........................ 711/137; 711/100; 711/122
(58) Field of Search ............................. 711/3, 100, 117, 711/118, 137, 138, 154, 122

(56) References Cited

U.S. PATENT DOCUMENTS

| 4,394,727 A | 7/1983 | Hoffman et al. |
| 4,418,382 A | 11/1983 | Larson et al. |
| 4,755,933 A | 7/1988 | Teshima et al. |
| 5,345,578 A | 9/1994 | Manasse |
| 5,361,391 A | 11/1994 | Westberg |
| 5,390,318 A | 2/1995 | Ramakrishnan et al. |
| 5,530,941 A | 6/1996 | Welsser et al. |
| 5,553,276 A | 9/1996 | Dean |
| 5,603,005 A | 2/1997 | Bauman et al. |
| 5,701,488 A | 12/1997 | White |
| 5,704,053 A | 12/1997 | Santhanam |
| 5,732,209 A | 3/1998 | Vigil et al. |
| 5,732,242 A | 3/1998 | Mowry |
| 5,737,565 A | 4/1998 | Mayfield |
| 5,742,804 A | 4/1998 | Yeh et al. |
| 5,751,994 A | 5/1998 | Weisser et al. |
| 5,774,685 A | 6/1998 | Dubey |
| 5,778,423 A | 7/1998 | Siles et al. |
| 5,822,790 A | 10/1998 | Mehrotra |

(List continued on next page.)

*Primary Examiner*—Tuan V. Thai
(74) *Attorney, Agent, or Firm*—Casimer K. Salys; Bracewell & Patterson, L.L.P.

(57) ABSTRACT

A method of operating a processing unit of a computer system, by issuing an instruction having an explicit prefetch request directly from an instruction sequence unit to a prefetch unit of the processing unit. The invention applies to values that are either operand data or instructions. In a preferred embodiment, two prefetch units are used, the first prefetch unit being hardware independent and dynamically monitoring one or more active streams associated with operations carried out by a core of the processing unit, and the second prefetch unit being aware of the lower level storage subsystem and sending with the prefetch request an indication that a prefetch value is to be loaded into a lower level cache of the processing unit. The invention may advantageously associate each prefetch request with a stream ID of an associated processor stream, or a processor ID of the requesting processing unit (the latter feature is particularly useful for caches which are shared by a processing unit cluster). If another prefetch value is requested from the memory hierarchy, and it is determined that a prefetch limit of cache usage has been met by the cache, then a cache line in the cache containing one of the earlier prefetch values is allocated for receiving the other prefetch value. The prefetch limit of cache usage may be established with a maximum number of sets in a congruence class usable by the requesting processing unit. A flag in a directory of the cache may be set to indicate that the prefetch value was retrieved as the result of a prefetch operation. In the implementation wherein the cache is a multi-level cache, a second flag in the cache directory may be set to indicate that the prefetch value has been sourced to an upstream cache. A cache line containing prefetch data can be automatically invalidated after a preset amount of time has passed since the prefetch value was requested.

20 Claims, 6 Drawing Sheets

U.S. PATENT DOCUMENTS

| | | |
|---|---|---|
| 5,828,578 A | 10/1998 | Blomgren |
| 5,884,055 A | 3/1999 | Tung et al. |
| 5,890,211 A | 3/1999 | Sokolov et al. |
| 5,920,887 A | 7/1999 | Sokolov et al. |
| 5,937,426 A | 8/1999 | Sokolov |
| 5,958,040 A | 9/1999 | Jouppl |
| 6,026,474 A | 2/2000 | Carter et al. |
| 6,049,891 A | 4/2000 | Inamoto |
| 6,081,479 A | 6/2000 | Ji et al. |
| 6,131,145 A | 10/2000 | Matsubara et al. |
| 6,168,111 B1 | 1/2001 | Inohara et al. |

METHOD FOR INSTRUCTION EXTENSIONS FOR A TIGHTLY COUPLED SPECULATIVE REQUEST UNIT

CROSS-REFERENCE TO RELATED APPLICATIONS

The present invention is related to the following applications filed concurrently with this application: U.S. patent application Ser. No. 09/345,643 entitled "LAYERED SPECULATIVE REQUEST UNIT WITH INSTRUCTION OPTIMIZED AND STORAGE HIERARCHY OPTIMIZED PARTITIONS" U.S. patent application Ser. No. 09/345,644 entitled "EXTENDED CACHE STATE WITH PREFETCHED STREAM ID INFORMATION" U.S. patent application Ser. No. 09/345,713 entitled "CACHE ALLOCATION POLICY BASED ON SPECULATIVE REQUEST HISTORY" U.S. patent application Ser. No. 09/345,714 entitled "OPTIMIZED CACHE ALLOCATION ALGORITHM FOR MULTIPLE SPECULATIVE REQUESTS" U.S. patent application Ser. No. 09/345,715 entitled "MECHANISM FOR HIGH PERFORMANCE TRANSFER OF SPECULATIVE REQUEST DATA BETWEEN LEVELS OF CACHE HIERARCHY" U.S. patent application Ser. No. 09/345,716 entitled "TIME BASED MECHANISM FOR CACHED SPECULATIVE DATA DEALLOCATION".

BACKGROUND OF THE INVENTION

1. Field of the Invention

The present invention generally relates to computer systems, and more specifically to an improved method of prefetching values (instructions or operand data) used by a processor core of a computer system. In particular, the present invention makes more efficient use of a cache hierarchy working in conjunction with prefetching (speculative requests).

2. Description of Related Art

The basic structure of a conventional computer system includes one or more processing units connected to various input/output devices for the user interface (such as a display monitor, keyboard and graphical pointing device), a permanent memory device (such as a hard disk, or a floppy diskette) for storing the computer's operating system and user programs, and a temporary memory device (such as random access memory or RAM) that is used by the processor(s) in carrying out program instructions. The evolution of computer processor architectures has transitioned from the now widely-accepted reduced instruction set computing (RISC) configurations, to so-called superscalar computer architectures, wherein multiple and concurrently operable execution units within the processor are integrated through a plurality of registers and control mechanisms.

The objective of superscalar architecture is to employ parallelism to maximize or substantially increase the number of program instructions (or "micro-operations") simultaneously processed by the multiple execution units during each interval of time (processor cycle), while ensuring that the order of instruction execution as defined by the programmer is reflected in the output. For example, the control mechanism must manage dependencies among the data being concurrently processed by the multiple execution units, and the control mechanism must ensure that integrity of sequentiality is maintained in the presence of precise interrupts and restarts. The control mechanism preferably provides instruction deletion capability such as is needed with instruction-defined branching operations, yet retains the overall order of the program execution. It is desirable to satisfy these objectives consistent with the further commercial objectives of minimizing electronic device count and complexity.

Figure 1:
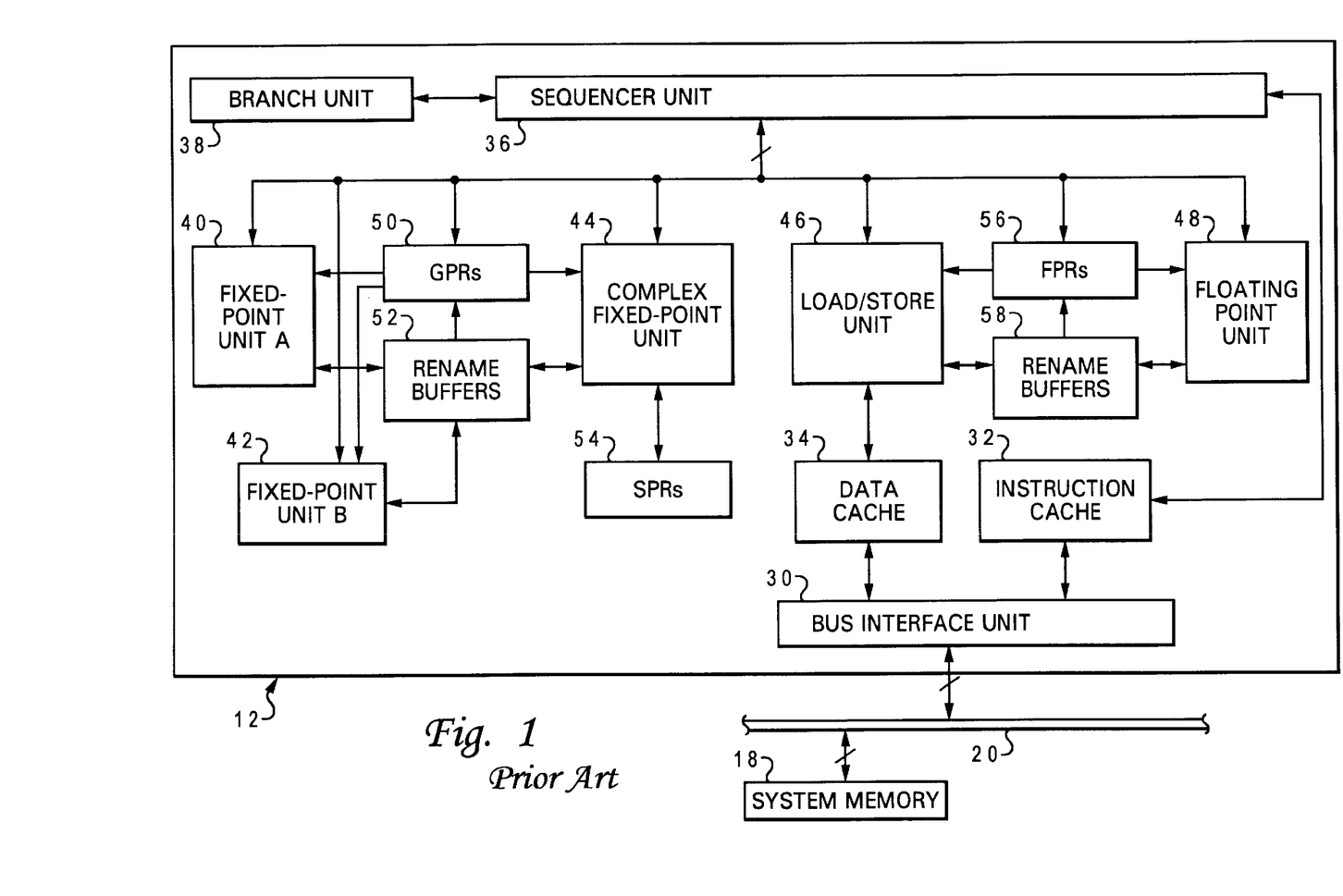
FIG. 1 is a block diagram of a conventional superscalar computer processor, depicting execution units, buffers, registers, and the on-board (L1) data and instruction caches.

An illustrative embodiment of a conventional processing unit for processing information is shown in FIG. 1, which depicts the architecture for a PowerPC™ microprocessor 12 manufactured by International Business Machines Corp. (IBM—assignee of the present invention) Processor 12 operates according to reduced instruction set computing (RISC) techniques, and is a single integrated circuit superscalar microprocessor. As discussed further below, processor 12 includes various execution units, registers, buffers, memories, and other functional units, which are all formed by integrated circuitry.

Processor 12 is coupled to a system bus 20 via a bus interface unit (BIU) 30 within processor 12. BIU 30 controls the transfer of information between processor 12 and other devices coupled to system bus 20 such as a main memory 18. Processor 12, system bus 20, and the other devices coupled to system bus 20 together form a host data processing system. Bus 20, as well as various other connections described, include more than one line or wire, e.g., the bus could be a 32-bit bus. BIU 30 is connected to a high speed instruction cache 32 and a high speed data cache 34. A lower level (L2) cache (not shown) may be provided as an intermediary between processor 12 and system bus 20. An L2 cache can store a much larger amount of information (instructions and operand data) than the on-board caches can, but at a longer access penalty. For example, the L2 cache may be a chip having a storage capacity of 512 kilobytes, while the processor may be an IBM PowerPC™ 604-series processor having on-board caches with 64 kilobytes of total storage. A given cache line usually has several memory words, e.g., a 64-byte line contains eight 8-byte words.

The output of instruction cache 32 is connected to a sequencer unit 36 (instruction dispatch unit, also referred to as an instruction sequence unit or ISU). In response to the particular instructions received from instruction cache 32, sequencer unit 36 outputs instructions to other execution circuitry of processor 12, including six execution units, namely, a branch unit 38, a fixed-point unit A (FXUA) 40, a fixed-point unit B (FXUB) 42, a complex fixed-point unit (CFXU) 44, a load/store unit (LSU) 46, and a floating-point unit (FPU) 48.

The inputs of FXUA 40, FXUB 42, CFXU 44 and LSU 46 also receive source operand information from general-purpose registers (GPRs) 50 and fixed-point rename buffers 52. The outputs of FXUA 40, FXUB 42, CFXU 44 and LSU 46 send destination operand information for storage at selected entries in fixed-point rename buffers 52. CFXU 44 further has an input and an output connected to special-purpose registers (SPRs) 54 for receiving and sending source operand information and destination operand information, respectively. An input of FPU 48 receives source operand information from floating-point registers (FPRs) 56 and floating-point rename buffers 58. The output of FPU 48 sends destination operand information to selected entries in floating-point rename buffers 58.

As is well known by those skilled in the art, each of execution units 38–48 executes one or more instructions within a particular class of sequential instructions during each processor cycle. For example, FXUA 42 performs fixed-point mathematical operations such as addition, subtraction, ANDing, ORing, and XORing utilizing source operands received from specified GPRs 50. Conversely, FPU 48 performs floating-point operations, such as floating-point multiplication and division, on source operands received from FPRs 56. As its name implies, LSU 46 executes floating-point and fixed-point instructions which either load operand data from memory (i.e., from data cache 34) into selected GPRs 50 or FPRs 56, or which store data from selected GPRs 50 or FPRs 56 to memory 18.

Processor 12 may include other registers, such as configuration registers, memory management registers, exception handling registers, and miscellaneous registers, which are not shown.

Processor 12 carries out program instructions from a user application or the operating system, by routing the instructions and operand data to the appropriate execution units, buffers and registers, and by sending the resulting output to the system memory device (RAM), or to some output device such as a display console or printer. A computer program can be broken down into a collection of processes which are executed by the processor(s). The smallest unit of operation to be performed within a process is referred to as a thread. The use of threads in modern operating systems is well known. Threads allow multiple execution paths within a single address space (the process context) to run concurrently on a processor. This "multithreading" increases throughput in a multi-processor system, and provides modularity in a uniprocessor system.

One problem with conventional processing is that operations are often delayed as they must wait on an instruction or item of data before processing of a thread may continue. One way to mitigate this effect is with multithreading, which allows the processor to switch its context and run another thread that is not dependent upon the requested value. Another approach to reducing overall memory latency is the use of caches, as discussed above. A related approach involves the prefetching of values. "Prefetching" refers to the speculative retrieval of values (operand data or instructions) from the memory hierarchy, and the temporary storage of the values in registers or buffers near the processor core, before they are actually needed. Then, when the value is needed, it can quickly be supplied to the sequencer unit, after which it can be executed (if it is an instruction) or acted upon (if it is data). Prefetch buffers differ from a cache in that a cache may contain values that were loaded in response to the actual execution of an operation (a load or i-fetch operation), while prefetching retrieves values prior to the execution of any such operation.

An instruction prefetch queue may hold, e.g., eight instructions to provide look-ahead capability. Branch unit 38 searches the instruction queue in sequencer unit 36 (typically only the bottom half of the queue) for a branch instruction and uses static branch prediction on unresolved conditional branches to allow the IFU to speculatively request instructions from a predicted target instruction stream while a conditional branch is evaluated (branch unit 38 also folds out branch instructions for unconditional branches). Static branch prediction is a mechanism by which software (for example, a compiler program) can give a hint to the computer hardware about the direction that the branch is likely to take. In this manner, when a correctly predicted branch is resolved, instruction execution continues without interruption along the predicated path. If branch prediction is incorrect, the IFU flushes all instructions from the instruction queue. Instruction issue then resumes with the instruction from the correct path.

A prefetch mechanism for operand data may also be provided within bus interface unit 30. This prefetch mechanism monitors the cache operations (i.e., cache misses) and detects data streams (requests to sequential memory lines). Based on the detected streams and using known patterns, BIU 30 speculatively issues requests for operand 5 data which have not yet been requested. BIU 30 can typically have up to four outstanding (detected) streams. Reload buffers are used to store the data until requested by data cache 34.

In spite of such approaches to reducing the effects of memory latencies, there are still significant delays associated with operations requiring memory access. As alluded to above, one cause of such delays is the incorrect prediction of a branch (for instructions) or a stream (for operand data). In the former case, the unused, speculatively requested instructions must be flushed, directly stalling the core. In the latter case, missed data is not available in the prefetch reload queues, and a considerable delay is incurred while the data is retrieved from elsewhere in the memory hierarchy. Much improvement is needed in the prefetching mechanism.

Another cause of significant delay is related to the effects that prefetching has on the cache hierarchy. For example, in multi-level cache hierarchies, it might be efficient under certain conditions to load prefetch values into lower cache levels, but not into upper cache levels. Also, when a speculative prefetch request misses a cache, the request may have to be retried an excessive number of times (when the lower level storage subsystem is busy), which unnecessarily wastes bus bandwidth, and the requested value might not ever be used. Furthermore, a cache can easily become "polluted" with speculative request data, i.e., the cache contains so much prefetch data that demand requests (those requests arising from actual load or i-fetch operations) frequently miss the cache. In this case the prefetch mechanism has overburdened the capacity of the cache, which can lead to thrashing. The cache replacement/victimization algorithm (such as a least-recently used, or LRU, algorithm) cannot account for the nature of the prefetch request. Moreover, after prefetched data has been used by the core (and is no longer required), it may stay in the cache for a relatively long time due to the LRU algorithm and might thus indirectly contribute to further cache misses (which is again particularly troublesome with misses of demand requests, rather than speculative requests). Finally, in multi-processor systems wherein one or more caches are shared by a plurality of processors, prefetching can result in uneven (and inefficient) use of the cache with respect to the sharing processors.

In light of the foregoing, it would be desirable to provide a method of speeding up core processing by improving the prefetching mechanism, particularly with respect to its interactions with the cache hierarchy. It would be further advantageous if the method allowed a programmer to optimize various features of the prefetching mechanism.

SUMMARY OF THE INVENTION

It is therefore one object of the present invention to provide an improved processor for a computer system, having a prefetch mechanism for instructions and/or operand data.

It is another object of the present invention to provide an improved data processing system using such a processor, which also has one or more caches in the memory hierarchy.

It is yet another object of the present invention to provide a computer system which makes more efficient use of a cache hierarchy working in conjunction with prefetching.

The foregoing objects are achieved in a method of operating a processing unit of a computer system, comprising the steps of loading a plurality of program instructions into an instruction sequence unit of the processing unit, determining that at least one of the loaded instructions includes an explicit prefetch request, issuing the instruction having the explicit prefetch request directly from the instruction sequence unit to a prefetch unit of the processing unit, and sending a request from the prefetch unit to prefetch a value residing in a memory hierarchy of the computer system that is specified in the instruction having the explicit prefetch request. The value can be either operand data or an instruction. The prefetch unit may be hardware independent, and dynamically monitoring one or more active streams associated with operations carried out by a core of the processing unit, or may be aware of the lower level storage subsystem such that the request may be sent with an indication that the value is to be loaded into a lower level cache of the processing unit. For a set associative cache, the speculative request may further be sent with an indication of which set of the lower level cache the requested value is to be loaded into. The instruction sequence unit issues the instruction directly to the prefetch unit according to a plurality of bits of the instruction which form an extension to an instruction set architecture for a core of the processing unit.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 2:
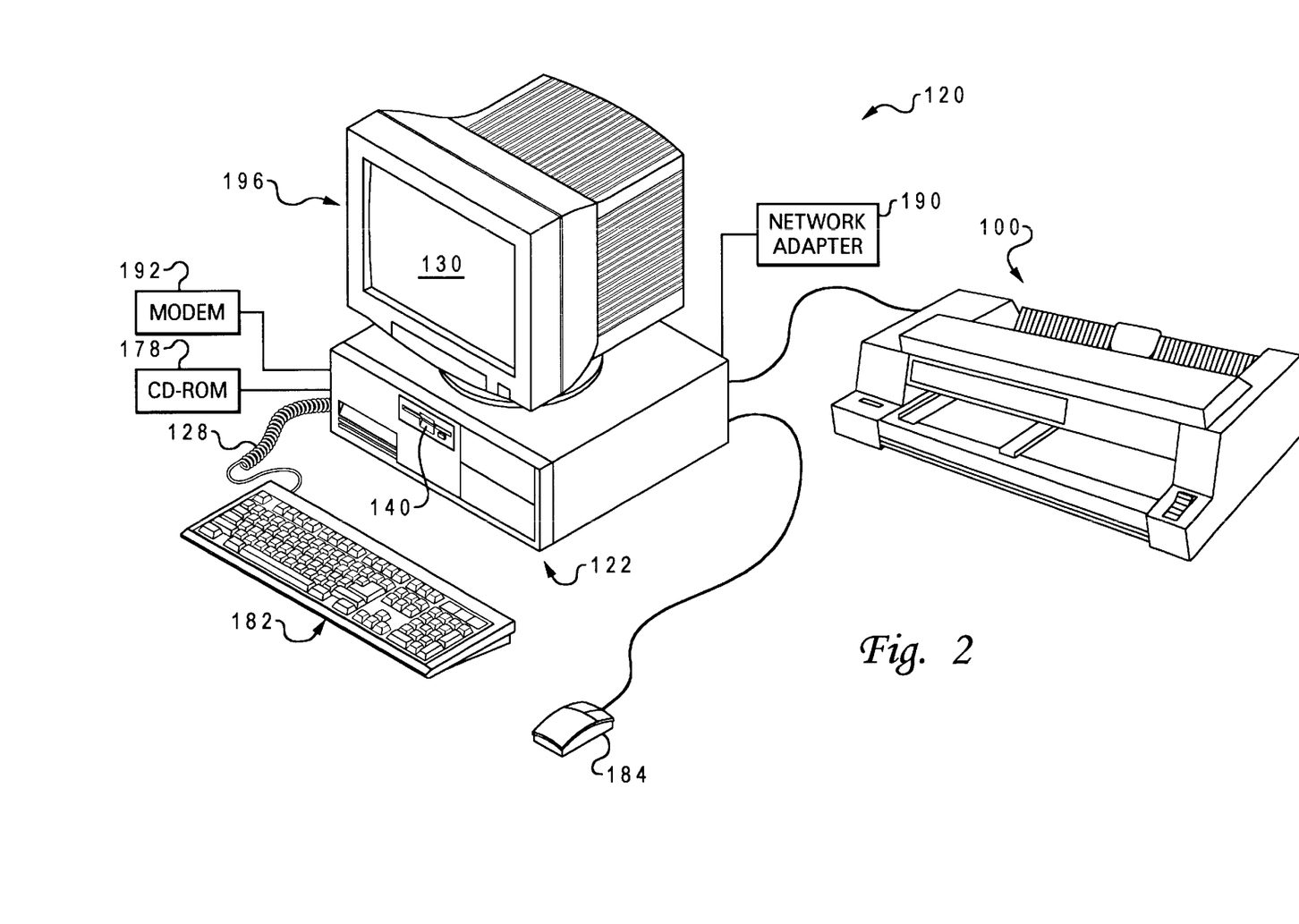
FIG. 2 is an illustration of one embodiment of a data processing system in which the present invention can be practiced.

With reference now to the figures, and in particular with reference to FIG. 2, a data processing system 120 is shown in which the present invention can be practiced. The data processing system 120 includes processor 122, keyboard 182, and display 196. Keyboard 182 is coupled to processor 122 by a cable 128. Display 196 includes display screen 130, which may be implemented using a cathode ray tube (CRT), a liquid crystal display (LCD), an electrode luminescent panel or the like. The data processing system 120 also includes pointing device 184, which may be implemented using a track ball, a joy stick, touch sensitive tablet or screen, track path, or as illustrated a mouse. The pointing device 184 may be used to move a pointer or cursor on display screen 130. Processor 122 may also be coupled to one or more peripheral devices such a modem 192, CD-ROM 178, network adapter 190, and floppy disk drive 140, each of which may be internal or external to the enclosure or processor 122. An output device such as a printer 100 may also be coupled with processor 122.

It should be noted and recognized by those persons of ordinary skill in the art that display 196, keyboard 182, and pointing device 184 may each be implemented using any one of several known off-the-shelf components.

Figure 3:
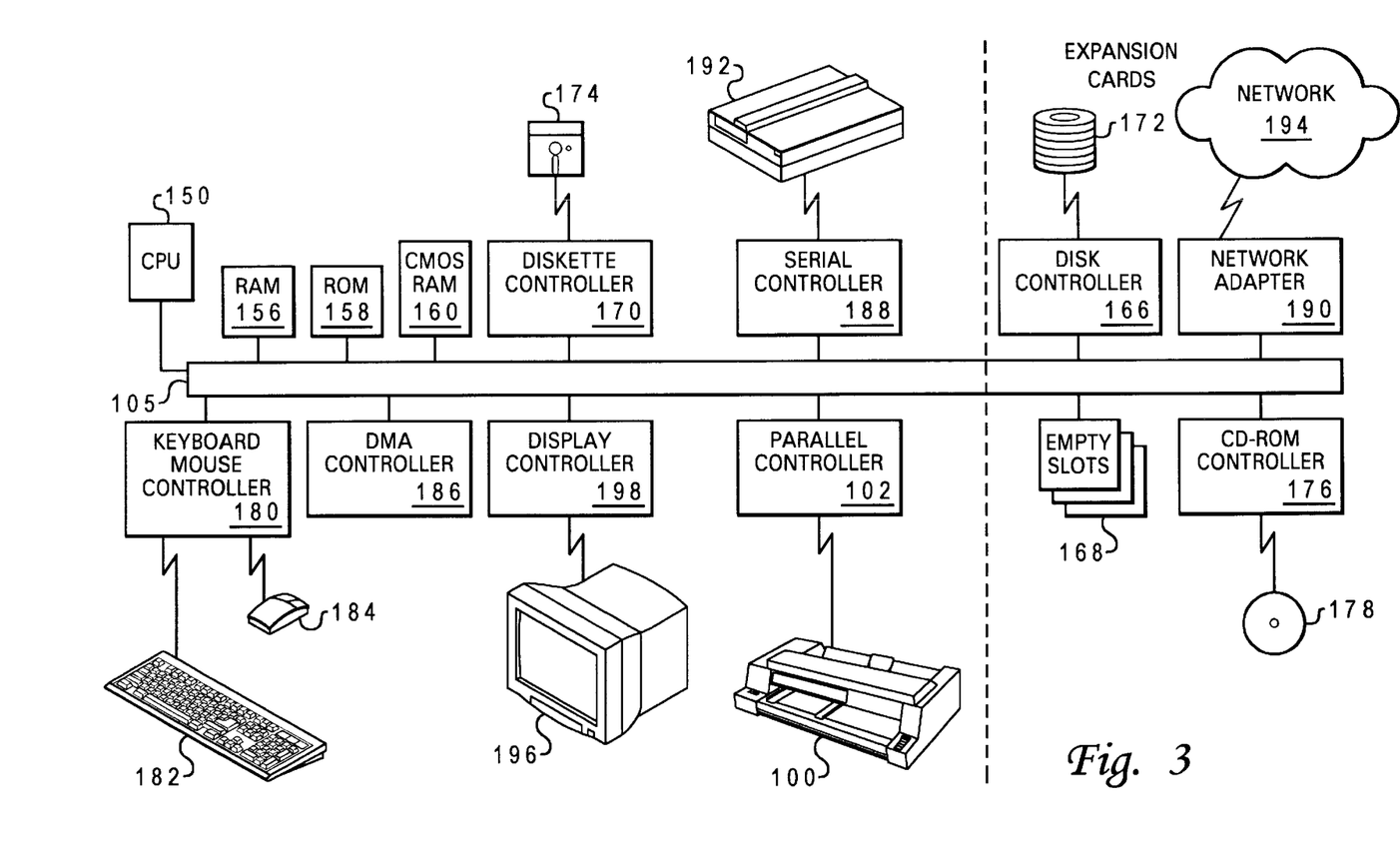
FIG. 3 is a block diagram illustrating selected components that can be included in the data processing system of FIG. 2 according to the teachings of the present invention.

Reference now being made to FIG. 3, a high level block diagram is shown illustrating selected components that can be included in the data processing system 120 of FIG. 2 according to the teachings of the present invention. The data processing system 120 is controlled primarily by computer readable instructions, which can be in the form of software, wherever, or by whatever means such software is stored or accessed. Such software may be executed within the Central Processing Unit (CPU) 150 to cause data processing system 120 to do work.

Memory devices coupled to system bus 105 include Random Access Memory (RAM) 156, Read Only Memory (ROM) 158, and nonvolatile memory 160. Such memories include circuitry that allows information to be stored and retrieved. ROMs contain stored data that cannot be modified. Data stored in RAM can be changed by CPU 150 or other hardware devices. Nonvolatile memory is memory that does not lose data when power is removed from it. Nonvolatile memories include ROM, EPROM, flash memory, or battery-pack CMOS RAM. As shown in FIG. 3, such battery-pack CMOS RAM may be used: to store configuration information.

An expansion card or board is a circuit board that includes chips and other electronic components connected that adds functions or resources to the computer. Typically, expansion cards add memory, disk-drive controllers 166, video support, parallel and serial ports, and internal modems. For lap top, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 168 may be used to receive various types of expansion cards or PCMCIA cards.

Disk controller 166 and diskette controller 170 both include special purpose integrated circuits and associated circuitry that direct and control reading from and writing to hard disk drive 172, and a floppy disk or diskette 74, respectively. Such disk controllers handle tasks such as positioning read/write head, mediating between the drive and the CPU 150, and controlling the transfer of information to and from memory. A single disk controller may be able to control more than one disk drive.

CD-ROM controller 176 may be included in data processing 120 for reading data from CD-ROM 178 (compact disk read only memory). Such CD-ROMs use laser optics rather than magnetic means for reading data.

Keyboard mouse controller 180 is provided in data processing system 120 for interfacing with keyboard 182 and pointing device 184. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by International Business Machines Corp. (IBM).

Communication between processing system 120 and other data processing systems may be facilitated by serial controller 188 and network adapter 190, both of which are coupled to system bus 105. Serial controller 188 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to with modem 192. A modem is a communication device that enables a computer to transmit information over standard telephone lines. Modems convert digital computer signals to interlock signals suitable for communications over telephone lines. Modem 192 can be utilized to connect data processing system 120 to an on-line information service or an Internet service provider. Such service providers may offer software that can be down loaded into data processing system 120 via modem 192. Modem 192 may provide a connection to other sources of software, such as a server, an electronic bulletin board (BBS), or the Internet (including the World Wide Web).

Network adapter 190 may be used to connect data processing system 120 to a local area network 194. Network 194 may provide computer users with means of communicating and transferring software and information electronically. Additionally, network 194 may provide distributed processing, which involves several computers in the sharing of workloads or cooperative efforts in performing a task. Network 194 can also provide a connection to other systems like those mentioned above (a BBS, the Internet, etc.).

Display 196, which is controlled by display controller 198, is used to display visual output generated by data processing system 120. Such visual output may include text, graphics, animated graphics, and video. Display 196 may be implemented with CRT-based video display, an LCD-based flat panel display, or a gas plasma-based flat-panel display. Display controller 198 includes electronic components required to generate a video signal that is sent to display 196.

Printer 100 may be coupled to data processing system 120 via parallel controller 102. Printer 100 is used to put text or a computer-generated image (or combinations thereof) on paper or on another medium, such as a transparency sheet. Other types of printers may include an image setter, a plotter, or a film recorder.

Parallel controller 102 is used to send multiple data and control bits simultaneously over wires connected between system bus 105 and another parallel communication device, such as a printer 100.

CPU 150 fetches, decodes, and executes instructions, and transfers information to and from other resources via the computers main data-transfer path, system bus 105. Such a bus connects the components in a data processing system 120 and defines the medium for data exchange. System bus 105 connects together and allows for the exchange of data between memory units 156, 158, and 160, CPU 150, and other devices as shown in FIG. 3. Those skilled in the art will appreciate that a data processing system constructed in accordance with the present invention may have multiple components selected from the foregoing, including even multiple processors.

Figure 4:
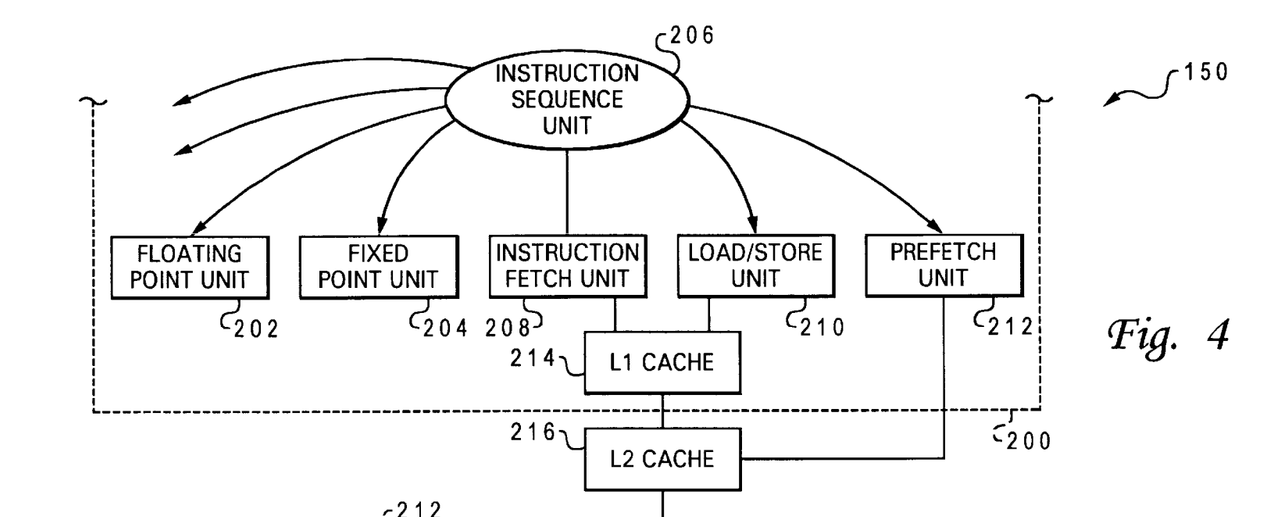
FIG. 4 is a block diagram of a central processing unit constructed in accordance with the present invention, having a multi-level cache hierarchy, and a prefetch unit linked to an instruction sequence unit which provides instructions to other execution units of the processor core.

Referring now to FIG. 4, one embodiment of the present invention allows data processing system 120 to more efficiently process information, by utilizing hints in the instruction set architecture used by the processor core of CPU 150 to exploit prefetching. The processor core 200 uses several conventional elements, including a plurality of registers, such as general purpose and special purpose registers (not shown), and a plurality of execution units, among them a floating point unit (FPU) 202, a fixed point unit (FXU) 204, and any other execution units desired such as a complex fixed-point unit (not shown). FPU 202 performs floating-point operations, such as floating-point multiplication and division, on source operands received from floating point registers. FXU 204 performs fixed-point mathematical operations such as addition, subtraction, ANDing, ORing, and XORing utilizing source operands received from specified general purpose registers.

Processor core 200 is further comprised of several novel elements such as an instruction sequence unit (ISU) 206, an instruction fetch unit (IFU) 208, a load/store unit (LSU) 210, and a prefetch unit (PFU) 212. ISU 206, IFU 208 and LSU 210 perform functions which include those performed by conventional execution units, but are further modified to enable the features described hereinafter. IFU 208 executes instruction fetches, while LSU 210 executes floating-point and fixed-point instructions which either load operand data from memory, or which store data to memory. ISU 206 outputs instructions to other execution circuitry of processor core 200.

IFU 208 and LSU 210 are connected to the on-board (L1) cache. Although not shown in FIG. 4, the L1 cache may actually comprise separate operand data and instruction caches. L1 cache 214 is further connected to the lower level storage subsystem which, in the illustrated embodiment, includes at least one additional cache level, L2 cache 216. L2 cache 216 may in turn be connected to another cache level, or to the main memory (RAM 156), via system bus 105.

PFU 212 is linked to ISU 206. The instruction set architecture (ISA) for the processor core (e.g., the ISA of a PowerPC™ 630 processor) is extended to include explicit prefetch instructions (speculative requests). ISU 206 is aware of PFU 212 and issues instructions directly to PFU according to bits in the extended instruction which are set by the software (the computer's operating system or user programs). This approach allows the software to better optimize scheduling of load and store operations (prediction techniques in software may be more accurate than hardware). PFU 212 may be split into an instruction prefetch unit and an operand data prefetch unit if desired.

Figure 5:
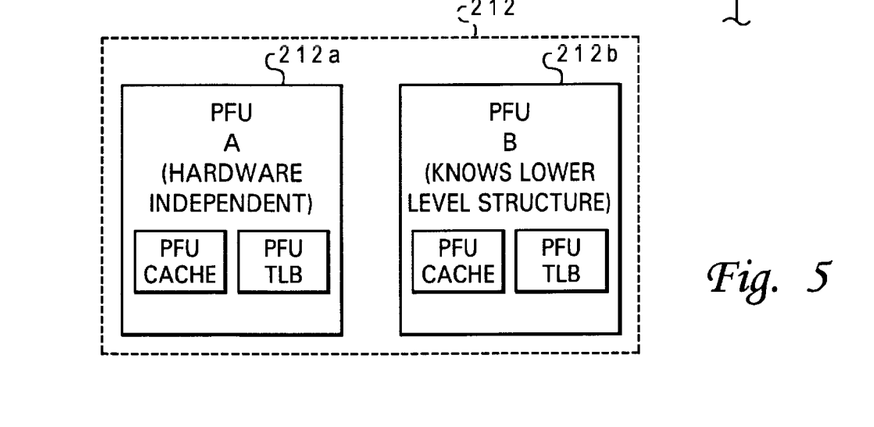
FIG. 5 is a block diagram of the prefetch unit of FIG. 4 according to one implementation of the present invention.

With further reference to FIG. 5, in the illustrative embodiment PFU 212 is actually comprised of two essentially separate prefetch units 212A and 212B. Each of these prefetch units may have its own arithmetic logic unit (ALU) functions, its own cache (with a directory, entry array, and replacement mechanism), and its own translation lookaside buffer (TLB). Prefetch unit A (PFUA) 212A is designed to be hardware independent, and dynamically monitors active streams. Prefetch unit B (PFUB) 212B is hardware dependent, as it is configured to have knowledge of the underlying storage hierarchy. More specifically, PFUB 212B is adapted for the prefetching of values into a lower level cache such as L2 cache 216. PFUB 212B is not only aware of the downstream hierarchy in terms of the number of cache levels, but may also be aware of their associativity, size, and latencies between levels. This information can be used to determine when it would be more efficient to load the values into a lower level cache without immediately loading them into the higher level (upstream) cache, the prefetch cache, or other units in the core. PFUB 212B may thus be used to prefetch values into any lower level cache, e.g., L3 or L4 (or both the L3 and L4 but not the L2). The explicit information in the extended instruction bits can apply to both PFUA 212A and PFUB 212B.

For set associative caches, the prefetch mechanism of the present invention may also be used to indicate which set of the cache line the value is to be loaded into. This capability can be used to minimize cache pollution and avoid thrashing and striding which arises from prefetches. The set can be passed down to the cache, along with other information such as an identification number (ID) that is uniquely associated with a particular stream detected by the PFU (PFU 212 monitors requests to IFU 208 and LSU 210). The stream ID can be used as described further below. The lower level caches can be designed to abandon speculative prefetches if the request is repeatedly retried by the downstream storage subsystem. This feature can also be programmably set by passing another bit from the PFU to the lower level cache.

Figure 6:
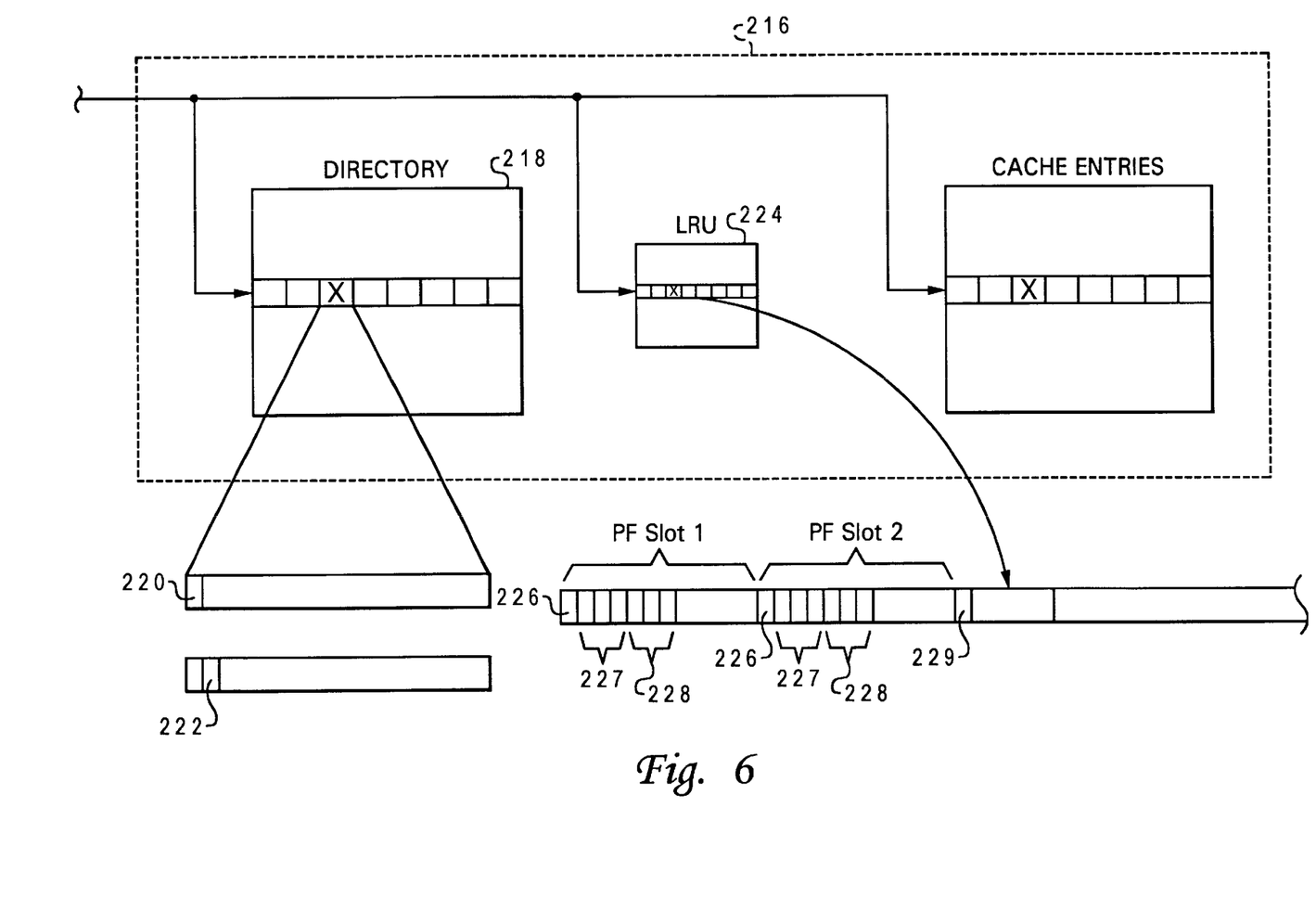
FIG. 6 is a block diagram of a lower level (e.g., L2) cache having a directory, an entry array, and a least-recently used (LRU) victim selection unit, wherein certain flags or bits are provided in the directory records and the LRU unit in accordance with a further implementation of the present invention.

Referring now to FIG. 6, one implementation of the present invention uses an L2 cache 216 which provides one or more special flags, for each directory entry, which relate to prefetching. A given entry in the directory 218 includes the conventional tag portion, and at least a first flag 220 which indicates whether the entry was retrieved as the result of a prefetch operation. This flag can then be scanned during later victim selection to allow future prefetches to allocate the previous prefetched request. Allocating a line containing a previously prefetched value, for use by a later speculative request, limits cache pollution by too many prefetched lines.

As also shown in FIG. 6, a directory entry may be provided with a second flag 222 which is used to indicate whether the speculatively requested value has also been sourced to the next higher cache level. In other words, for L2 cache 216, if the second flag 222 is set, this means that the prefetch value has already been forwarded to L1 cache 214. Whenever the L2 cache misses a congruence class having a line with the second flag set, that line can automatically be invalidated and allocated for the later requested value. This feature is particularly useful with a non-inclusive cache, since future L2 misses may allocate the prefetched line that has already been forwarded to the next higher level, without the need of invalidating the line in the higher level, making particularly efficient use of the multi-level cache structure. If the first flag 220 is set but second flag 222 is not, meaning that the value was prefetched but has not yet been forwarded, then a victim can be selected using a standard victim selection algorithm, such as a least-recently, or less-recently, used (LRU) algorithm, which is applied to all sets including the prefetched line. Both of the flags 220 and 222 can be used for either instructions or operand data loaded in the cache, and the corresponding features can be made programmable using, e.g., mode bits.

FIG. 6 also depicts how the present invention allows the LRU unit 224 to use prefetch information in carrying out the victim selection process. In order to avoid filling up the cache with speculative requests, a limit may be designed into LRU unit 224, e.g., only two sets out of eight to be used for prefetch requests (the number of sets could of course be lower or higher). Two bits 226 in a given congruence class are used to indicate whether any allocated lines in that class are from prefetch requests. These lines are referred to as prefetch (PF) slots 1 and 2. When a prefetch request misses the L2 cache and neither slot is allocated, a victim is selected using the standard LRU algorithm. Bit 226 for slot 1 is then flagged, and the number of the set chosen for victimization is loaded into a set ID field 227 for slot 1. When a later prefetch request again misses the L2 cache, bit 226 for slot 2 is flagged, and the number of the set chosen for the second prefetch request is loaded into the set ID field 227 for slot 2.

The prefetch slots are not exclusively used for speculative requests; they may be used for non-prefetch requests if the standard LRU algorithm were to selected that set for victimization.

Additionally, a plurality of bits 228 are used to hold the stream ID of the stream associated with each prefetch value. In this manner, if a future prefetch request misses the L2 cache, and its stream ID matches that for one of the PF allocated slots 1 or 2, then the matching slot is automatically selected for victimization (the odds are that, if the original prefetched data is not used by the time another request in the same stream hits that congruence class, then the original data will not be used, since sequential memory lines generally are not directed to the same congruence class). The selection of the matching slot can further limit pollution of the cache with prefetch data. An additional bit 229 may optionally be utilized to indicate, as between the two slots, which is the most recently used, for those cases wherein a prefetch request misses the L2 cache and both slots already have prefetched lines with different stream IDs.

If a demand request hits L2 cache 216 on a prefetch value, the LRU algorithm is updated as normal, but load hits do not affect bit 229. As a further enhancement, load hits could be used to reset bits 226.

Victimization of a prefetched line may also be based on a time delay, i.e., the amount of time passing since the speculative request was issued. In those applications wherein the time window for expected demand of the prefetch value is well understood, there is no need to wait for another cache miss; the line can be immediately invalidated when a timer runs out. The time delay may be fixed or programmable, and a mode bit may be used to turn off the feature altogether. This feature can effectively be used in conjunction with the flags 220 and 222, by simply setting flag 222 in response to the timeout, which would have the same effect of invalidating that line.

Figure 7:
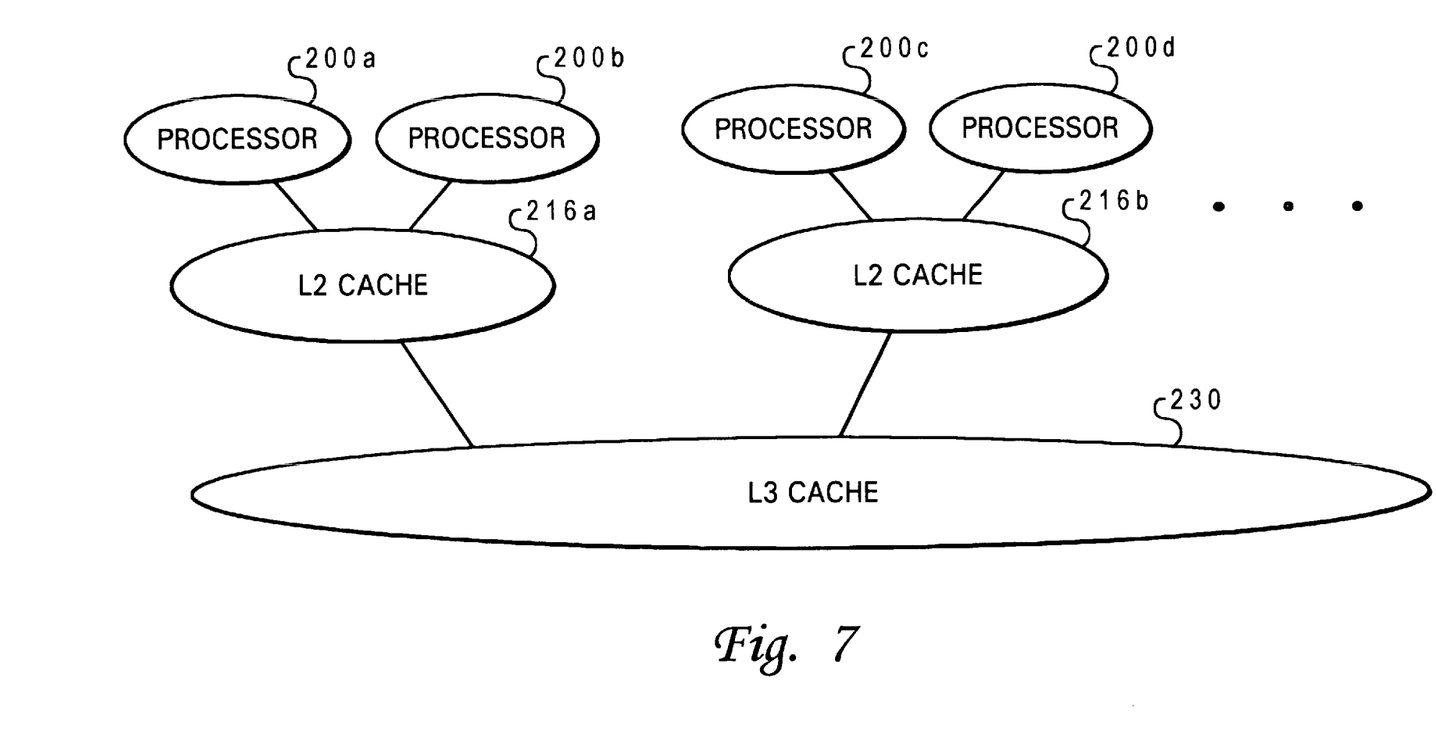
FIG. 7 is a block diagram of a multi-processor, multi-level cache data processing system constructed in accordance with the present invention wherein certain caches are shared by more than one processor core.

The present invention further contemplates improved 5 prefetching within a cache hierarchy having vertical caches that support a processor core cluster, as illustrated in FIG. 7. In that implementation, a given processor 200a, 200b, 200c or 200d has its own on-board (L1) cache, but each L2 cache 216a, 216b, supports (is shared by) two processors. Further, an L3 cache 230 supports more than one L2 cache. For such a cache hierarchy, the prefetch request may send down (in addition to the information previously described) a processor or CPU number. This CPU number can then be used by an LRU unit in any of the L2 or L3 caches to further optimize the replacement algorithm. For example, the number of sets in a given congruence class usable by different cores can be limited (e.g., either one of the processors 200a or 200b can utilize at most four sets within a given congruence class in L2 cache 216a, and at most two sets within a given congruence class in L3 cache 230). As with the PF slots described above, each LRU unit can also maintain separate information for determining the least-recently used line among the sets usable by a given core.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of operating a processing unit of a computer system, comprising:
   loading a plurality of program instructions into an instruction sequence unit of the processing unit;
   determining that at least one of the loaded instructions includes an explicit prefetch indication;
   issuing the instruction having the explicit prefetch indication directly from the instruction sequence unit to a prefetch unit of the processing unit; and
   sending a prefetch request from the prefetch unit to prefetch a value residing in a memory hierarchy of the computer system that is specified in the instruction having the explicit prefetch indication.

2. The method of claim 1 wherein the prefetch value is operand data and further comprising the step of loading the operand data into a register of the processing unit.

3. The method of claim 1 wherein the prefetch value is an instruction and further comprising the step of loading the instruction into an execution unit of the processing unit.

4. The method of claim 1 wherein the prefetch unit is hardware independent and further comprising the step of the prefetch unit dynamically monitoring one or more active streams associated with operations carried out by a core of the processing unit.

5. The method of claim 1 further comprising the step of loading the requested value into a cache of the prefetch unit.

6. The method of claim 1 wherein the memory hierarchy includes a multi-level cache, and said sending step sends with the request an indication that the value is to be loaded into a lower level cache of the processing unit.

7. The method of claim 6 wherein the lower level cache is set associative, and said sending step sends with the request an indication of which set of the lower level cache the requested value is to be loaded into.

8. The method of claim 1 wherein the instruction sequence unit issues the instruction directly to the prefetch unit according to a plurality of bits of the instruction which form an extension to an instruction set architecture for a core of the processing unit.

9. The method of claim 8 further comprising setting the extension bits in response to execution of a user program running on the computer system.

10. The method of claim 8 further comprising setting the extension bits in response to execution of an operating system running on the computer system.

11. A processing unit for a computer system, said processing unit comprising:
    a plurality of execution units including a prefetch unit; and
    an instruction sequence unit having means for determining that a given program instruction loaded in said instruction sequence unit includes an explicit prefetch indication and means for issuing the given program instruction having the explicit prefetch indication directly from said instruction sequence unit to said prefetch unit;
    wherein said prefetch unit, responsive to said receipt of said given program instruction, processes said given instruction to generate and output a prefetch request for a value residing in a memory hierarchy of the computer system.

12. The processing unit of claim 11 wherein the given instruction is an operand data load instruction, and further comprising a data cache for receiving operand data identified by the given instruction.

13. The processing unit of claim 11 wherein the given instruction is an instruction fetch instruction, and further comprising an instruction cache for receiving a requested instruction identified by the given instruction.

14. The processing unit of claim 11 wherein said prefetch unit is hardware independent and includes means for dynamically monitoring one or more active streams associated with operations carried out by a core of the processing unit.

15. The processing unit of claim 11 wherein said prefetch unit has a prefetch cache.

16. The processing unit of claim 11 wherein a memory hierarchy of the computer system includes a multi-level cache, and said prefetch unit includes means for sending a prefetch request with an indication that a requested value is to be loaded into a lower level cache of the memory hierarchy.

17. The processing unit of claim 16 wherein said lower level cache is set associative, and said sending means sends with the request an indication of which set of said lower level cache the requested value is to be loaded into.

18. The processing unit of claim 11 wherein issuing means issues the given instruction directly to said prefetch unit according to a plurality of bits of the given instruction which form an extension to an instruction set architecture for a core of the processing unit.

19. The method of claim 11, and further comprising the prefetch unit processing said instruction to generate the prefetch request.

20. A data processing system, comprising:
    a memory hierarchy;
    a plurality of execution units including a prefetch unit; and
    an instruction sequence unit that decodes a plurality of instructions and, responsive to a determination that a given instruction among said plurality of instructions includes an explicit prefetch indication, issues the given instruction having the explicit prefetch indication directly from said instruction sequence unit to said prefetch unit;
    wherein said plurality prefetch unit, responsive to said receipt of said given instruction, processes said given instruction to generate a prefetch request for a value and outputs the prefetch request to the memory hierarchy.

* * * * *